(12) United States Patent
Mowatt et al.

(10) Patent No.: US 11,586,746 B2
(45) Date of Patent: Feb. 21, 2023

(54) INTEGRATION MANAGEMENT OF APPLICATIONS

(71) Applicant: MICROSOFT TECHNOLOGY LICENSING, LLC, Redmond, WA (US)

(72) Inventors: David Mowatt, Dublin (IE); Ankit Govil, Marathahalli (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/915,665

(22) Filed: Jun. 29, 2020

(65) Prior Publication Data
US 2021/0141912 A1    May 13, 2021

(51) Int. Cl.
*H04L 29/06* (2006.01)
*G06F 21/62* (2013.01)

(52) U.S. Cl.
CPC .................... *G06F 21/62* (2013.01)

(58) Field of Classification Search
CPC ........... G06F 21/62; G06F 21/50; G06F 21/45
See application file for complete search history.

(56) References Cited

U.S. PATENT DOCUMENTS

| | | | |
|---|---|---|---|
| 9,292,423 | B1 | 3/2016 | Doshi et al. |
| 9,729,404 | B2 * | 8/2017 | Handurukande ... H04L 41/5032 |
| 10,083,245 | B1 * | 9/2018 | Jezewski ............. H04L 63/0428 |
| 10,102,354 | B2 | 10/2018 | Wessling et al. |
| 2001/0011341 | A1 | 8/2001 | Hayes et al. |
| 2003/0208636 | A1 * | 11/2003 | Heddings ................ G06F 21/10 |
| | | | 719/316 |
| 2009/0037287 | A1 | 2/2009 | Baitalmal et al. |
| 2012/0066135 | A1 * | 3/2012 | Garst .................... G06F 21/121 |
| | | | 705/59 |
| 2013/0326499 | A1 | 12/2013 | Mowatt et al. |
| 2014/0282358 | A1 | 9/2014 | Mowatt et al. |

(Continued)

OTHER PUBLICATIONS

"Connected App Use Cases", Retrieved from: https://help.salesforce.com/articleView?id=connected_app_about.htm&type=5, Retrieved Date: Jan. 8, 2020, 2 Pages.

(Continued)

*Primary Examiner* — Jason K Gee
(74) *Attorney, Agent, or Firm* — NovoTechIP International PLLC

(57) ABSTRACT

The technology described herein improves data security and software functionality in an integrated application deployment. Security is improved by providing granular permission management to application resources at the application program interface (API) level. This granular control allows the primary application to provide access to only the minimal resources the secondary application needs to complete a task. The technology described herein provides a more efficient access control scheme by facilitating group management of permissions. The technology described herein also improves an application update process by eliminating the need for permissions to be reassigned every time a primary application or secondary application is updated. Finally, the technology described herein provides a centralized permission enforcement that is independent of the primary or secondary application.

9 Claims, 9 Drawing Sheets

(56) References Cited

U.S. PATENT DOCUMENTS

2014/0365384 A1 12/2014 Mowatt et al.
2019/0102121 A1* 4/2019 Hayami ................ G06F 3/1225

OTHER PUBLICATIONS

"Using Oracle Cloud Marketplace Partner Portal", Retrieved from: https://docs.oracle.com/en/cloud/marketplace/partner-portal/partp/using-oracle-cloud-marketplace-partner-portal.pdf, Feb. 2020, 87 Pages.

Rebrovic, Jackie, "Enable ISVS with an Integration Marketplace", Retrieved from: https://blog.cloud-elements.com/enable-isvs-with-an-integration-marketplace, May 31, 2018, 6 Pages.

"International Search Report and Written Opinion Issued in PCT Application No. PCT/US2020/056234", dated Feb. 3, 2021, 11 Pages.

* cited by examiner

INTEGRATION MANAGEMENT OF APPLICATIONS

CROSS-REFERENCE TO RELATED APPLICATION

This Nonprovisional Patent Application claims priority to India Patent Application No. 201941045445, which was filed Nov. 8, 2019, and which is titled "Integration Management of Applications," the contents of which is incorporated herein by reference in its entirety.

BACKGROUND

Today, millions of organizations acquire software from multiple software vendors. In some cases, companies license an entire productivity suite of applications (e.g. Microsoft Office) to meet their business needs. In most cases, corporations use a variety of software to accomplish their goals. For example, sales software, warehouse management software, and accounting software may be used by a single organization to perform various employment functions, such as payroll, customer support, marketing, accounting, and human resources, among others. Efficiency may be improved by integrating these applications with each other since a single real-world task is often completed using multiple applications. Integration of applications poses multiple functional and security challenges. For example, when either a primary application (program receiving integration) or a secondary application (program being integrated into a primary application) is updated the two programs may no longer function together. Integrating programs may allow for complete or partial access to the other program's data and functions. Managing these permissions across a large number of applications in an enterprise or personal environment is a technical challenge.

SUMMARY

The technology described herein improves data security and software functionality in an integrated application deployment. An integrated application deployment occurs when a primary application is integrated with components of a secondary application. Security is improved by providing granular permission management to application resources at the application program interface (API) level. This granular control allows the primary application to provide access to only the minimal resources the secondary application needs to complete a task. The technology described herein improves resource security by providing a centralize permission store that tracks and enforces API permissions across multiple primary applications and multiple secondary applications. The centralized permission store may also manage these permissions across an entity's entire computing environment.

The technology described herein provides a more efficient access control scheme by facilitating group management of permissions. For example, a vendor may publish a group of secondary applications designed to be integrated into a primary application. The technology described herein allows permissions for the group of secondary applications to be managed (e.g., given or revoked) together. Access to a primary-application's API may be given to a secondary-application group built based on a common attribute, such as a common publisher, store, or vendor. The group management may also extend to primary applications, such as those that share an API. In one aspect, a single instruction may give a secondary application or group of secondary applications access to an API shared by multiple primary applications. In one aspects, a group of APIs may be managed as a group. APIs may be grouped by related functions.

At a high level, a secondary application may designate one or more APIs accessed when the secondary application is integrated with a primary application. A user of the primary application may then grant access on an API-by-API basis. These permission instructions are stored in a permission store and used to authorize API usage when a secondary application attempts to use the API.

The technology described herein also improves an application update process by eliminating the need for permissions to be reassigned every time a primary application or secondary application is updated. In an aspect, the permission store receives a list of APIs the new version of a secondary application will access once integrated. This list is compared to the APIs the previous version of the secondary application already had permission to access. If two groups of APIs match exactly then the permission store is automatically updated to given the new version access the requested APIs. If the new request includes one or more APIs that the previous version did not have permission to access, then a permission request may be sent to an administrator. If the new request includes only APIs the previous version could access, but also omits one or more APIs the previous version could access, then the permission store may be updated to give the new version access to only the newly requested APIs. This effectively revokes access to the other APIs automatically and maintains access to only the minimally required resources.

Finally, the technology described herein provides a centralized permission enforcement that is independent of the primary or secondary application. Upon receiving a request from a secondary application at an API, the primary application may send a permission inquiry to the permission store. Upon receiving confirmation that the secondary application has permission to use the API, the primary application may respond to the secondary application's request. Conversely, the primary application may deny the request upon learning the secondary application does not have permission to access the API. In one aspect, the primary application implements an access confirmation process for API calls from secondary applications using the permissions store. The primary application may send details of the API call to the permissions store in a security inquiry message. The security inquiry message may identify the API and the secondary application along with other information. The permissions store replies with an access granted or denied message depending on whether the secondary application has been granted access to the API. The primary application then grants or denies access to the API according to the message received from the permissions store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
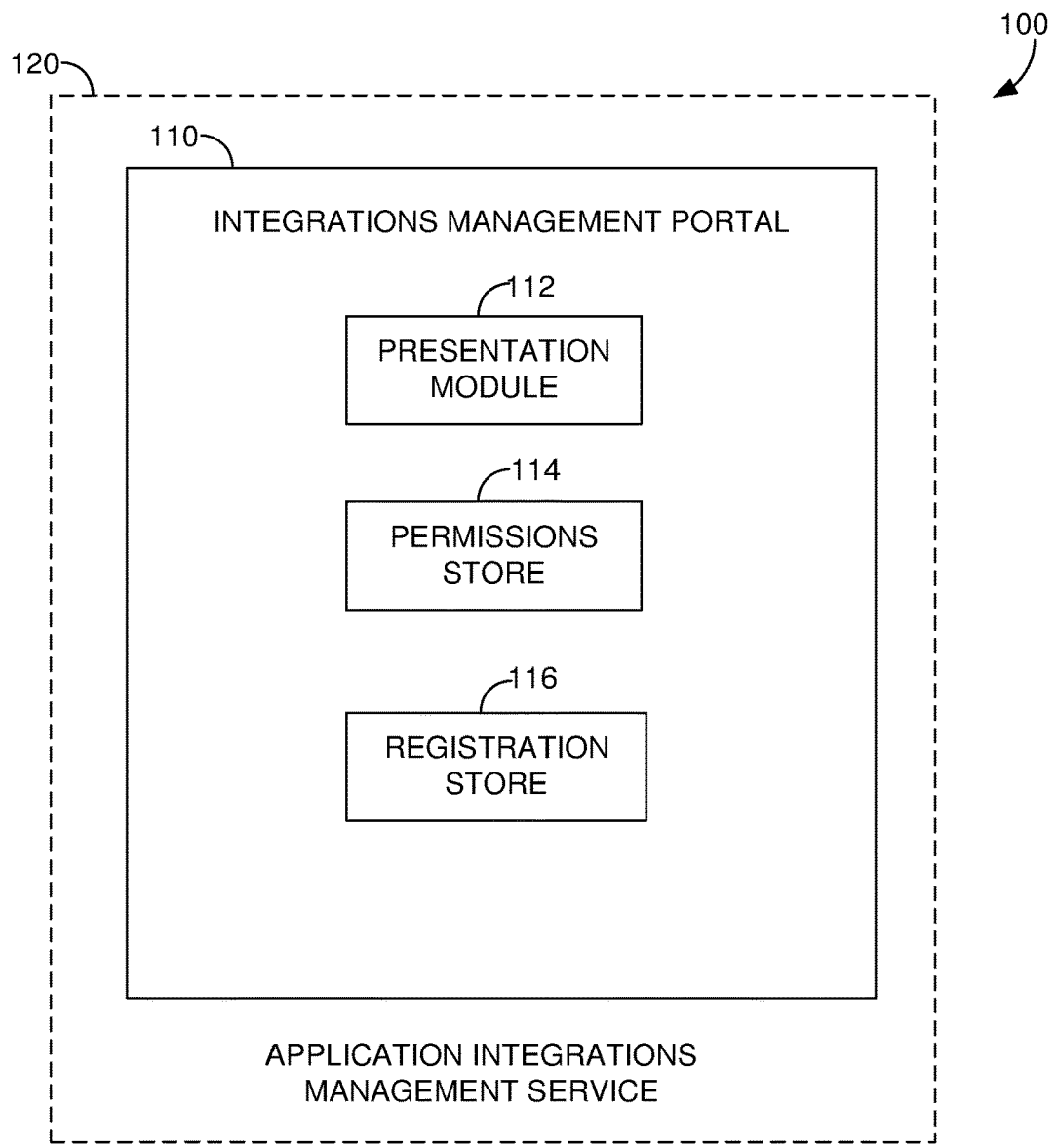
FIG. 1 is a block diagram of an example application integrations management services, suitable for use in implementing aspects of the technology described herein.

Overview of Technical Problems, Technical Solutions, and Technological Improvements The technology described herein improves data security and software functionality in an integrated application deployment. An integrated application deployment occurs when a primary application is integrated with components of a secondary application. The technology described herein improves data security during, at least, the three major phases of integration: deployment, updating, and deactivation. Without the use of this technology, security failures can result from mistakes made granting, maintaining, or revoking permissions during each of these three phases. Commonly, users expend effort to set permissions during deployment (e.g., install), but fail to review these permissions during the update process or deactivation. This technology improves security by automatically evaluating the minimum permissions an application needs to function and adjusting the permissions granted to match the minimum. This process automatically avoids granting more access than the minimum required throughout the integration life cycle. In order to maintain the minimum permissions, application permissions may be automatically withdrawn in response to a determination the application no longer needs the permission to function. Automatic permission evaluation and adjustment may be triggered during the update and deactivation phases and/or at other points in the integration life cycle.

Security during all phases is improved by enabling the management of application groups, rather than just allowing permission management on an application-by-application basis. Application groups can be formed automatically when applications originate from the same source (e.g., software company). Security is improved by facilitating unified management across a group of secondary applications and by providing granular permission management to application resources at the application program interface (API) level on both a group and individual basis. This granular control allows the primary application to provide access to only the minimal resources the secondary application needs to complete a task.

The technology described herein improves resource security by providing a centralize permission store that tracks and enforces API permissions across multiple primary applications and multiple secondary applications. The centralized permission store may also manage these permissions across an entity's entire computing environment.

The technology described herein provides a more efficient access control scheme by facilitating group management. For example, a vendor may publish a group of secondary applications designed to be integrated into a primary application. The technology described herein allows permissions for the group of secondary applications to be managed (e.g., given or revoked) together. Access to a primary-application's API may be given to a secondary-application group built based on a common attribute, such as a common publisher, store, or vendor. The group management may also extend to primary applications, such as those that share an API. In one aspect, a single instruction may give a secondary application or group of secondary applications access to an API shared by multiple primary applications. In one aspects, a group of APIs may be managed as a group. APIs may be grouped by related functions.

At a high level, a secondary application may designate one or more APIs accessed when the secondary application is integrated with a primary application. A user of the primary application may then grant access on an API-by-API basis. These permission instructions are stored in a permission store and used to authorize API usage when a secondary application attempts to use the API.

The technology described herein also improves an application update process by eliminating the need for permissions to be reassigned every time a primary application or secondary application is updated. In an aspect, the permission store receives a list of APIs the new version of a secondary application will access once integrated. This list is compared to the APIs the previous version of the secondary application already had permission to access. If two groups of APIs match exactly then the permission store is automatically updated to given the new version access the requested APIs. If the new request includes one or more APIs that the previous version did not have permission to access, then a permission request may be sent to an administrator. If the new request includes only APIs the previous version could access, but also omits one or more APIs the previous version could access, then the permission store may be updated to give the new version access to only the newly requested APIs. This effectively revokes access to the other APIs automatically and maintains access to only the minimally required resources.

Finally, the technology described herein provides a centralized permission enforcement that is independent of the primary or secondary application. Upon receiving a request from a secondary application at an API, the primary application may send a permission inquiry to the permission store. Upon receiving confirmation that the secondary application has permission to use the API, the primary application may respond to the secondary application's request. Conversely, the primary application may deny the request upon learning the secondary application does not have permission to access the API. In one aspect, the primary application implements an access confirmation process for API calls from secondary applications using the permissions store.

The primary application may send details of the API call to the permissions store in a security inquiry message. The security inquiry message may identify the API and the secondary application along with other information. The permissions store replies with an access granted or denied message depending on whether the secondary application has been granted access to the API. The primary application then grants or denies access to the API according to the message received from the permissions store.

A secondary application may access data and functions of the primary application through the primary-application APIs. As used herein, a primary-application API is an application managed by the primary application to access a resource, such as data. The primary-application API does not need to originate with the primary application.

Integration occurs when one or more functionalities of the secondary application are available through the primary application (and possibly vice versa). Once integrated, the secondary application's functionalities may be provided in response to an input from the primary application. The secondary application's function may require the primary application to share access to a primary-application resource, such as application state data, application user data, application enterprise data, and the like. These resources may be shared by giving the secondary application access to the primary-application's state data through one or more APIs. The technology described herein uses a permission store to grant a secondary application access only to APIs that are needed to perform certain desired functions.

As used herein, the terms primary application and secondary application are used to designate an application granting resource access and an application receiving resource access through a permission instruction managed by the permission store. The application granting access is described as the primary application. The application receiving access is the secondary application. A single primary application may give access to multiple secondary applications. Similarly, a single secondary application may receive access to resources from multiple primary applications. In reality, a single application, such as an email program, may both grant access to another application and receive access to another application. In other words, applications may be server different roles in different deployments, even on the same computing device. Thus, the email program is referred to as the primary application when another program accesses an email-program resource. The email program may be a secondary application when the email program accesses another program's resource. Secondary applications are sometimes described as "ad-ins" herein.

Application groups may be formed based on applications originating with the same source, such as a common developer. The present technology may use an identification system to identify application sources. For example, the technology may associate multiple applications with a source identification in an application store. In order to validate a source when adding the application to the application store, the technology may implement various security authentication steps, such as two-factor authentication using a specific email address known to be associated with the developer.

Currently, companies use a variety of software applications and/or a software suite to accomplish their business tasks. Enabling software from different vendors to operate across platforms is a critical component of using enterprise software. Many software vendors create add-ins, add-ons, or other software integrations that enable companies to optimize production by integrating software from multiple vendors into a single user experience. For example, sales software might be integrated with email software to provide sales insight to a user who is a reading an email regarding sales information.

Today, productivity software solutions are diverse suites of software applications that seamlessly enable user to get their work done. Developing add-ins for a suite of software applications is often difficult because each application in the productivity software suite is inherently different and grows in a variety of ways increasing the level of effort required to integrate a new feature into each application in the suite. Installation of these add-ins (or secondary applications) means installing many different applications all from the same vendor into each primary application in the productivity suite. As a result, most productivity suite software manufacturers (and the constraints of the software platforms that they integrate with) require add-ins to be installed individually leading to extensive manual efforts and inconsistencies.

Traditionally, software vendors allowed developers to produce a single secondary application that may be integrated into multiple primary applications. However, because software updates are prevalent and vastly change how an independent software vendor's (ISV) code interacts with the primary application, ISVs had to re-author or re-write code to enable effective integration into a suite of primary applications. For example, the migration of customers from a previous integration to a newer integration may require major manual efforts from each customer to accept the secondary application with the new integration into a primary application. As a result, developers must tailor their integrations for deployment to each particular application or platform.

Moreover, companies have enabled users to manage integrations individually, but this places the onus on the user to determine if the necessary secondary application integrations are available for the same underlying service or suite of primary applications. Because the necessary information for an administrator to evaluate whether an app is trustworthy, based on the permissions it requires, is not available in one location, it is difficult for administrators to make decisions about integrations. Similarly, revoking permissions form a particular secondary application involves remembering individual portals or dashboards to visit to completely revoke data access or other permissions. Thus, there is a desire for a single location where users (e.g., administrators) may access and manage integrations as a whole instead of using a piecemeal approach.

Aspects of the present invention are directed to simple and efficient methods, systems, and computer storage media for managing integrations (e.g., applications, programs, or other software) based on permission management operations. In aspects, integrations (e.g., secondary applications that expand the capability of other software, applications, and/or programs) may be deployed to multiple primary applications at once using a single consent process. Aspects of the present invention may provide integrations as a single package, such that operations may be performed on the entire package as a single entity. In particular, the single bundle of secondary applications may be evaluated, consented to, deployed, updated, and managed using an integrations manager that is based on permissions registered in advance of deploying the integrations.

In operation, aspects of the present invention provide a means for registering secondary applications and storing their corresponding registration and permission information. Aspects of the present invention utilize a permission store to keep track of registered secondary applications and store their corresponding information. Aspects of the present invention also utilize a permissions store to store information about the integrations, including permissions, that allow the integration to work with other primary applications, software, platforms, and the like (e.g., which APIs the integration needs to access and/or call). By registering secondary applications and storing their corresponding registration and permission information, aspects of the present invention may present the necessary information to a user to make an informed consent decision in a single place.

To achieve this, two discrete components are required in the registration store. First, the app must register itself with the registration store securely, so that (at runtime when using the app) the registration store may confidently know that the app is the particular app it claims to be. Aspects of the present invention may receive and store an ID and secrets that the registered application uses to request data from other applications, but other implementations are possible for those skilled in the art.

In one aspect, the secondary application declares the set of permissions that are needed to integrate with a primary application. In a basic implementation, this could be the minimal set of resources that the secondary application needs at runtime. In more advanced implementations, this could be a range of resources that the secondary application might use, depending on the capabilities that a given customer of the secondary application may wish to use. A user then consents to the permission(s) presented, possibly on an API-by-API basis. These presented permissions are based on the permissions that have been saved or registered with the particular secondary application that is to be integrated in the other primary applications.

Once a user consents, the consent decision is recorded for later reference. For example, aspects of the present invention may record that a user (who may be in a particular organization) gave consent for the secondary application to access certain data or resources within that organization. As a result, when the secondary application makes an API call that requires certain permissions, aspects of the present invention may check the permissions store to determine if proper consent has been given. Alternatively, the consent may be determined by checking the permissions recorded in the application's installation manifest.

Advantageously, aspects of the present invention allow a single vendor's secondary applications to be implemented, consented to, and deployed, among other operations, rather than individually managing the operations and deploying the secondary applications separately. By allowing a set of secondary applications to be trusted using a single, unified consent decision by associating secondary applications into a single package, administrators/users use less resources and are more efficient at deploying secondary applications to a fleet of software/primary applications. Additionally, aspects of the present invention provide a single mechanism to prevent data from being shared with a secondary application if permissions or other trust attributes are revoked from a given vendor. This single mechanism also allows users to revoke data access for all ISV secondary applications in a single place even though the secondary applications are separately managed by different software components running in separate systems. Furthermore, aspects of the present invention enable users to manage common attributes for secondary applications, including user or admin assignments, or attributes such as corporate branding or the level in-product prominence, in a way that is done once across all products.

Overview of Example Environments for Providing a Single Interface for Managing Application Integrations Aspects of the invention may be described by way of examples and with reference to FIG. 1 and additional illustrations below. FIG. 1 and the additional illustrations below are associated with an exemplary computing environment (application integrations management environment 100) suitable for use in implementing aspects of the invention. Generally, the computing environment is suitable for providing a single interface for managing permissions of an primary application using an integrations management portal 110 that may perform operations (e.g., evaluate, deploy, update, manage etc.) for integrating a secondary application into one or more primary applications. With initial reference to FIG. 1, FIG. 1 discloses integration operations management environment 100, integration operations management service 120, integrations management portal 110 having presentation module 112, permissions store 114, and registration store 116.

It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

At a high level, aspects of the present invention are directed to providing a central deployment service (e.g., application integrations management service 120) for deploying secondary applications (e.g., add-on, add-in applications, "independent software vendor "ISV" applications collectively referred to herein as "secondary applications") in computing environments (e.g., customer and/or application user platform). An app developer provides secondary applications for deployment in an application user platform. When the secondary applications is deployed, the secondary applications may operate with a primary application.

The central deployment service utilized by application integrations management service 120 may be an integration management portal 110 that operates as a storage service and supports performing integration management operations for deploying secondary applications. The integration management portal 110 may provide different types of instructions that support the integration management operations including: storing instructions that support storing secondary applications (e.g., discrete add-on apps or joint add-on apps) to a store service; pre-registration instructions that support pre-registering or storing application programming interfaces (APIs) (e.g., including API calls) made by each secondary application; deployment instructions (e.g., single secondary application deployment instructions or joint deployment instructions) that support deploying secondary applications in combination; consent management instructions (i.e., storage and enforcement) that supports management of customer consent information; verification instructions that support identification of an app developer (e.g., app developer manager or ISV manager); deployment recommendation instructions that support recommending to a customer that a first secondary application and a secondary application may be deployed in combination; update instructions provide automatic updates, the update instructions deny automatic updates associated with API access request when the API access request is for access privileges that are higher than access privileges approved by the customer; and bundling instructions support combining secondary application from separate store services in a combined app deployment bundle.

Specifically, the integrations management operations of application integrations management service 120 include receiving and registering an secondary application through the integrations management portal 110 for providing the corresponding APIs, ID, and secrets that the secondary application must use to request data using the APIs in a distributed computing environment. Although not shown for clarity, application integrations management service 120 may be a part of a distributed computing system.

Integrations management portal 110 contains presentation module 112, permissions store 114 and registration store 116. Each of these components are utilized individually or in combination by aspects of the present invention to provide a single interface for users to consent to the permissions and API calls for a particular secondary application and deploy multiple secondary applications in a single location.

Presentation module 112 of integrations management portal 110 is utilized to present secondary application information to a user. For example, presentation module 112 may display a secondary application's icon and screenshots of the secondary application in operation. This corresponding information may be included and associated with a secondary application that is registered in registrations store 116. Furthermore, presentation module 112 may present permission information associated with a secondary application or primary application in permissions store 114. For example, presentation module may display the API calls that a specific secondary application needs in order to access particular customer data.

As briefly mentioned above, permissions store 114 of integrations management portal 110 stores permission information associated with a registered secondary application. Similarly, registrations store 116 of integrations management portal 110 receives registration information (e.g., icons, screenshots, etc.) associated with a primary and/or secondary application. As contemplated by aspects of the present invention, registrations store 116 of integrations management portal 110 may receive registration information for multiple secondary applications. Advantageously, by storing the information separately, aspects of the present invention may update either permission information or registration information without changing other associated data.

As a result, integrations management portal 110 of an application integrations management service 120 provides a single interface for managing permission settings of a secondary application and/or primary application. Overall, aspects of the present invention allow users (e.g., system administrators) to make a single, unified consent decision about all of secondary application's integrations and deploy the integrations. Moreover, aspects of the present invention enable users to revoke data access for all of an independent software vendor's (ISV's) secondary applications in a single place, even though the secondary applications are separately managed software component running in separate systems. Further inventive aspects of aspects of the present invention are described in more detail below.

Figure 2:
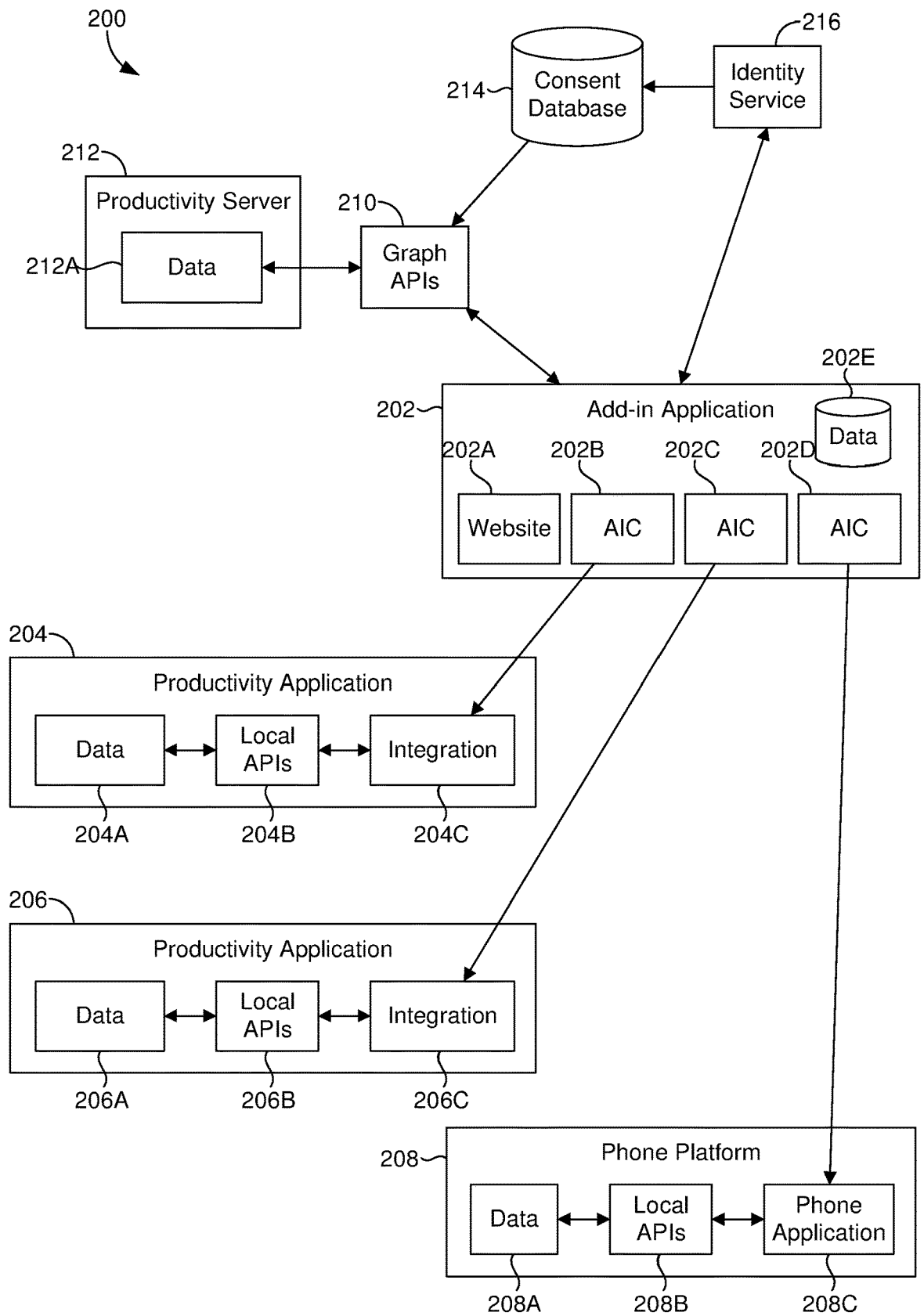
FIG. 2 is an example integrated environment for managing application integrations based on permission management operations, in accordance with aspects of the present invention.

FIG. 2 is an example of an integrated environment for managing application integrations based on permission management operations, in accordance with aspects of the technology described herein. As shown, FIG. 2 demonstrates a simplified diagram of a secondary application (e.g., ISV service) and its integration through different types of primary applications and/or platforms, after secondary application 202 (described as add-in application in FIG. 2) has been installed on a system. Add-in application 202 may have a data store 202E and a plurality of application-integration components (AICs) 202A-D that work in different ways for different platforms. In some aspects, each of the application-integration components (AICs) 202A-D may be described as a secondary application. For example, each one of application-integration components 202B-C may be integrated into different productivity application suites or, for example, integration 202A may work as website. As such, the plurality of application-integration components 202A-D may be integrated into different platforms or primary applications, or serve as standalone websites.

The plurality of application-integration components 202A-D may each have different functions and span multiple platforms and sets of APIs. It is contemplated that the plurality of integrations could be authored in different programming languages or hosted as a service on entirely differently platforms. As one example of a software service with multiple integrations, add-in application 202 may be a customer relationship management (CRM) software service. As such, add-in application 202 may have an application-integration components website 202A where customers may login to see a sales dashboard detailing information about the customer's sales activity. Additionally, add-in application 202 may have a productivity application integration (e.g., Microsoft Outlook), shown as logic 202B integrated into productivity application 204 through application-integration component 202C. In this case, productivity application 204 is a primary application. As shown, productivity application 204 has its own resident data store 204A that is accessed by application-integration component 204C through local APIs 204B. As such, application-integration components 204C enables productivity application 204 to show or display sales data related to a customer who sends an email to another customer.

Further, add-in application 202 may have a second productivity application-integration (e.g., Microsoft Teams) component, shown as application-integration component 202C integrated into productivity application 206 through application-integration component 206C. As shown, productivity application 206 has its own resident data store 206A that is accessed by application-integration component 206C through local APIs 206B. As such, application-integration component 206C through productivity application 206 allows customers to discuss the status of a particular quote among multiple team members. Lastly, add-in application 202 may have a phone application that serves as an integration, shown as application-integration component 202D integrated into phone platform 208 through phone application 208C. As shown, phone platform 208 has its own resident data store 208A that is accessed by phone application 208C through local APIs 208B. As such, the phone application 208C is a phone application from add-in application 202 that may be used to view sales data on a phone (e.g., customers using the same phone platform will be able to view sales data through the CRM service). These examples illustrate the diversity of integrations contemplated by aspects of the present invention.

It is contemplated that data stores 202E, 204A, 206A, 208A, and 212A store a plurality of customer information necessary for add-in application 202 to work seamlessly with productivity applications 204 and 206, and phone platform 208. For example, a customer may have their own data (e.g., employee names in an address book, emails among employees, documents that employees have authored, financial or product data in a database, etc.) that add-in application 202 needs to access to perform various operations. It is valuable for a customer to maximize value both from an add-in application's productivity suite and from a separate add-in application's service which requires data sharing between the two systems. Thus, for an application to be fully functional, an add-in application service (e.g., ISV service), such as add-in application 202, needs the ability to access data from a cloud environment, from devices, from within the productivity suite documents that a user is interacting with, etc. As such, FIG. 2 shows a fully integrated environment where customer data is stored in data stores 202E, 204A, 206A, 208A, and 212A.

Aspects of the technology described herein manage resource permissions to ensure that an add-in application may only access what a customer agrees to share and to guarantee that such information is assembled properly when there are a plurality of applications and integrations, each of which may require access to different APIs to handles different scenarios and programing tasks.

Figure 3:
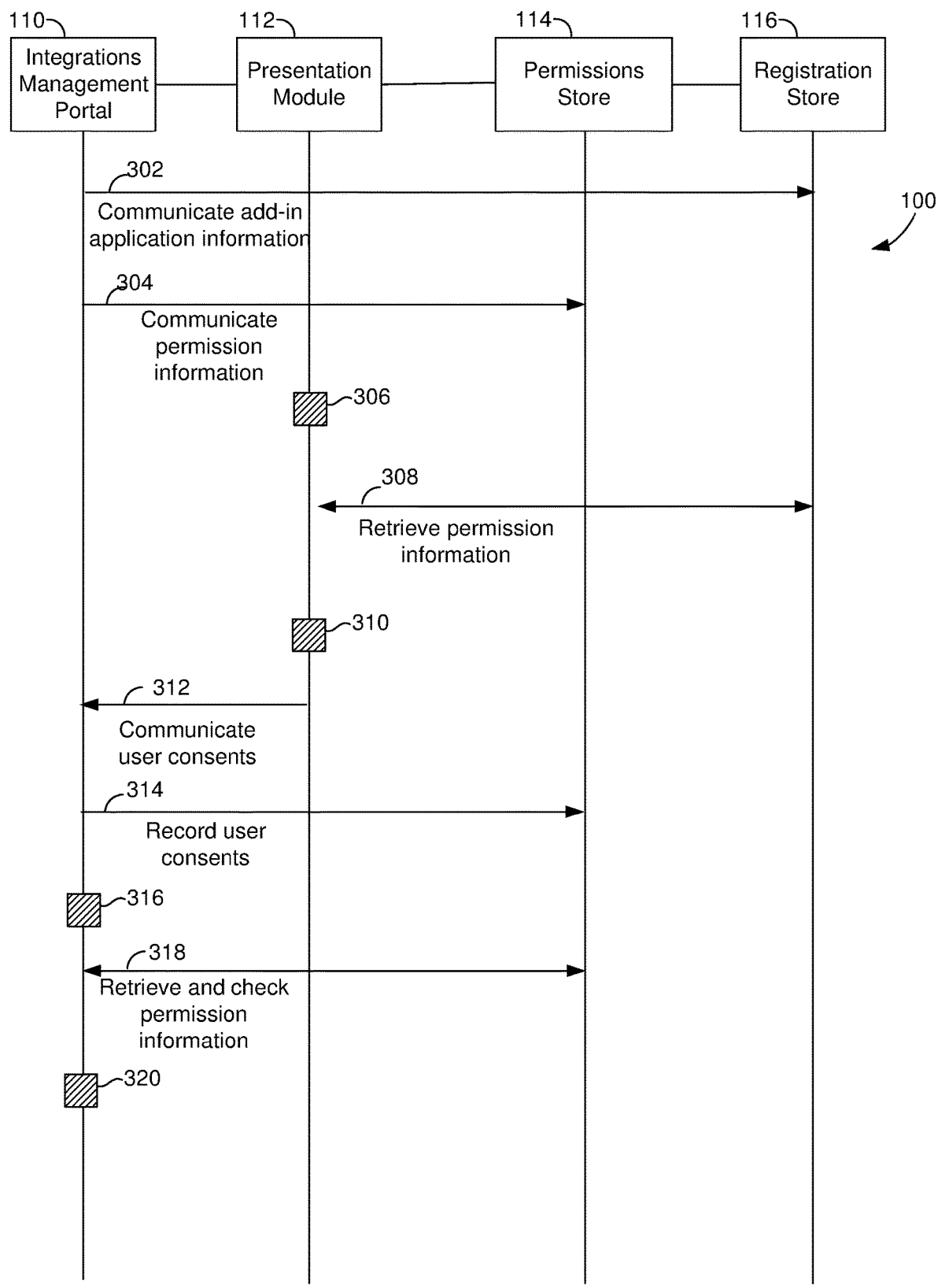
FIG. 3 is a diagram illustrating a method for managing application integrations based on permission management operations, in accordance with aspects of the present invention.
Figure 4:
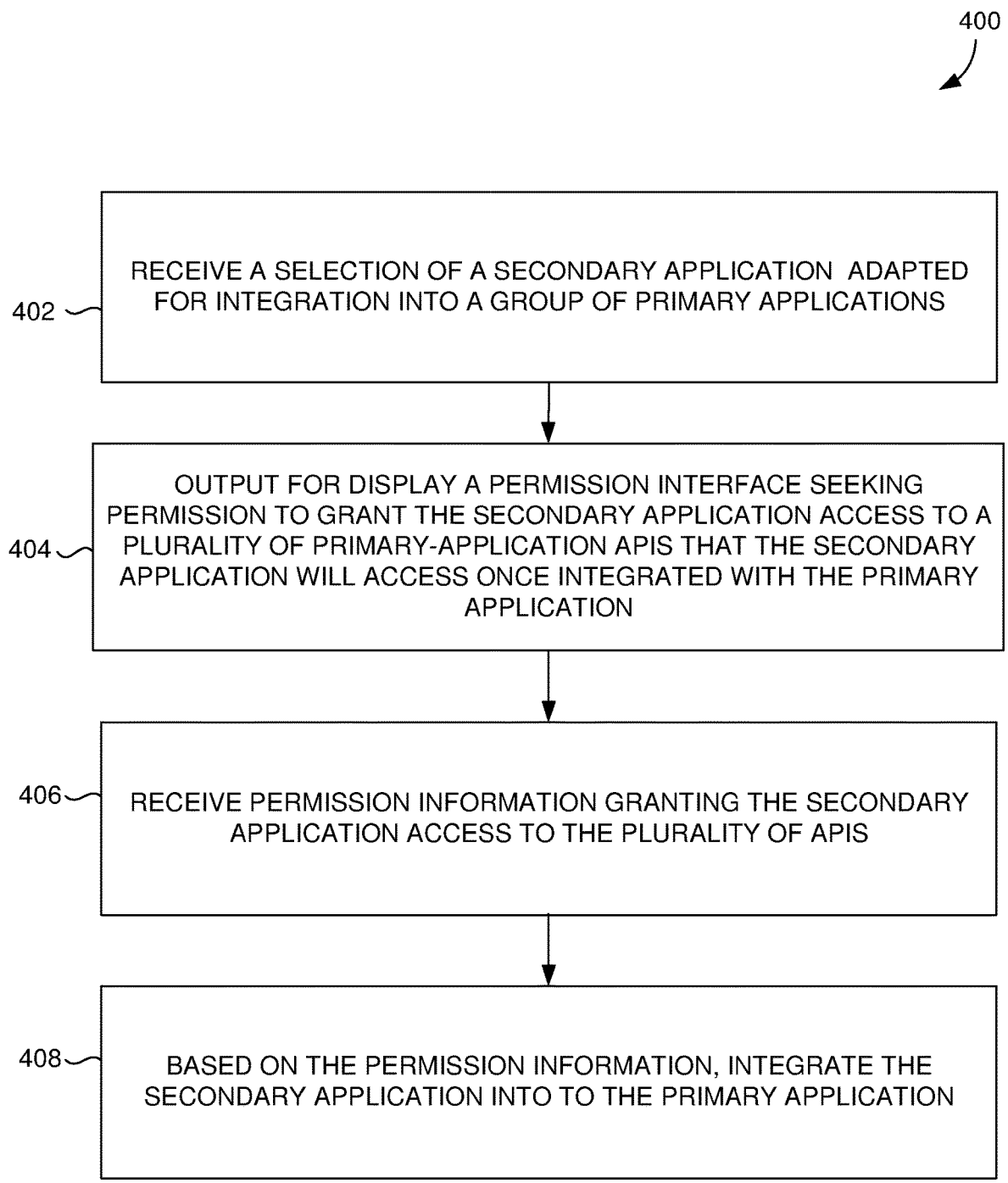
FIG. 4 provides a method of managing application integrations based on permission management operations, in accordance with aspects of the present invention.

Exemplary Methods for Providing a Single Interface for Managing Application Integrations With reference to FIGS. 3 and 4 diagrams are provided illustrating methods for managing permission settings of an application using an integration management portal. The methods may be performed using the application integrations management environment described herein and in conjunction with FIG. 1. In aspects, one or more computer storage media having computer-executable instructions embodied thereon that, when executed, by one or more processors may cause the one or more processors to perform methods in the application integrations management environment.

Turning now to FIG. 3, an exemplary diagram for managing permission settings of a primary application is shown. The permissions may be managed using an integration management portal that performs permission management operations (e.g., evaluate, deploy, update, manage etc.) for integrating the secondary application into one or more different primary applications. FIG. 3 also discusses application integrations management environment 100 with integrations management portal 110, presentation module 112, permissions store 113, and registration store 116. In aspects, one or more computer storage media having computer-executable instructions embodied thereon that, when executed, by one or more processors may cause the one or more processors to perform the methods in the storage system.

Although not shown for clarity, in some instances, a secondary application may initially be vetted through an independent verification process. Integrations management portal 110 may be connected to an application store where developers or other application providers may provide or submit secondary applications for a verification process. For example, this allows secondary applications to be uploaded by an ISV to the integrations management portal 110. As another example, ISVs may also provide secondary application updates through integrations management portal 110. Advantageously, secondary application updates may be pushed out to multiple tenants via integrations management portal 110.

At step 302, a secondary application is uploaded to a store portal, such as registration store 116. The secondary application may be uploaded by an ISV. For example, an ISV may register their secondary application with a data access provider, such as Azure Active Directory. This step may require the developer or user who uploaded the secondary application to provide information regarding the secondary application. This may also include information that allows for the ISV to change settings of their secondary application. Additionally, by providing registration information (including metadata information, such as the title of the secondary application, a descriptions, screenshots, etc.) the secondary application may be validated to ensure the secondary application (and the developer who wrote the secondary application) is trustworthy.

At step 304, permissions and other information are sent to permissions store 114. Information sent to the permissions store 114 may include an ID, secrets, APIs, permissions, and other information that primary applications must have access to in order to operate (e.g., request data) with the secondary application properly. Additionally, the permissions and other information may include information that relates multiple secondary applications together such that the multiple secondary application may be deployed together. In some instances, common attributes of secondary applications (e.g., seller and title information) may be used to determine relationships between multiple secondary applications to determine which may be deployed together. The information sent to the permissions store 114 may also include where the set of APIs are located. For example, the set of APIs may be stored and listed in the secondary application's manifest. Alternatively, the APIs could be specified in a store portal and associated with the corresponding secondary application. As one example, a secondary application may register information in permissions store 114 that the secondary application needs access to an employee directory API. Aspects of the present invention may register the secondary application with an ID (e.g., a GUID) of 6543 and a secret key of FGHI. By sending and registering this information up front, aspects of the present invention enable a customer to be appraised what data a given secondary application must be trusted with for the secondary application to run. Additionally, it enables platforms to ensure that no other API may be called, even if a secondary application tries to call it. For secondary applications that have multiple integrations with different primary applications, aspects of the present invention contemplate that a common ID and secret may be used for all integrations. However, secondary applications (e.g., ISV applications) may use different application registrations for each integration with a primary application, in aspects.

Additionally, aspects of the present invention allow an ISV to register its own identity with registration store 116 to allow for offline identity vetting. In some instances, an ISV portal may be a separate component from registration store 116. For example, an ISV may visit a separate portal where it may create an account to confirm and vet the ISV's identity. Once confirmed, the ISV's information may be communicated to registration store 116. In other instances, the ISV portal may be associated with or a part of registration store 116. For example, an ISV may create an account with registration store 116 to confirm the ISV's identity. Once registered, an ISV may submit each of its secondary applications with registration store 116 by submitting a secondary application package with associated data used to display the registered secondary application. In some scenarios, the actual package itself may not be submitted to the store, but rather a references to another registration store may be recorded by the ISV. For example, an ISV may send information to a registration store (e.g., Microsoft Store) detailing that the ISV's mobile application is in another application store designed for another platform and has an ID of 12345 in the other application store. In other cases, an ISV may give its registered application ID to registration store 116, it may also be extracted from the secondary application package itself (e.g., an Azure App ID may be part of the manifest within a submitted application store package), or the set of requested APIs by the ISV could be registered in the store.

Once registered and corresponding permission information is communicated, aspects of the present invention are able to block API calls based on the registration and permission information in permissions store 114 and registration store 115. For example, a given secondary application may not be able to call any cloud-based APIs that are blocked by a data access provider. Instead, the secondary application may call APIs that are local to a productivity app suite, local to the device, or both. The set of APIs that an ISV declared and registered may be specified in the secondary application manifest or in permissions store 114. It is contemplated that in some implementations, the set of APIs that an ISV declared and registered may be cached on a user's device. Additionally, aspects of the present invention may specify the relationships between different secondary applications registered by an ISV. For example, an ISV may specify the IDs of two secondary applications that are located in the same registration store. As another example, aspects of present invention may obtain identifiers from other trusted catalogs (e.g., other application stores from other companies). At this point, after step 304 is complete, aspects of the present invention have certified the identity of a plurality of ISVs and registered each ISVs account utilizing permissions store 114 and registration store 116. Thus, aspects of the present invention use permission information in permissions store 114 and registration store 116 to determine the minimal required set of APIs that may be accessed and used by a specific secondary application.

At block 306, a selection from a user is made indicating a secondary application to display. For example, aspects of the present invention may present a customer with a gallery of available secondary applications for them to install based on primary applications (e.g., Microsoft Office) and identity services (e.g., Microsoft Organizations AAD accounts) installed in the customer's environment using registration information in registration store 116 and permissions information in permissions store 114. As such, when a customer browses a store and picks a secondary application from an ISV (e.g., a CRM software service), aspects of the present invention may present the customer with a full list of all secondary applications, websites, and connectors, among others, for that particular ISV.

At step 308, upon selection of a particular secondary application to install, aspects of the present invention retrieve the corresponding permissions information for the secondary application selected. At step 310 the corresponding permission information for a selected secondary application is presented to a user via presentation module 112. In other words, aspects of the present invention present the customer with a complete list of the API access requests associated with the selected secondary application based on the retrieved permission information. This list of the API access requests corresponds to a set of all primary applications for the selected secondary application. In other words, the permission information presented will apply to each primary application into which the selected secondary application that is integrated. The corresponding permission information is displayed by retrieving the extracted API permission requests from each secondary application manifest and also retrieving all registered data access requests from a data consent service. In some aspects, API request information could be retrieved from other trusted application stores of other companies. Thus, aspects of the present invention present a user with a unified consent screen that displays necessary permission information for a given secondary application and/or primary application.

At step 312, aspects of the present invention communicate a user's consents to integration management portal 110 and subsequently send and record the consents in permissions store 114 at step 314. It is contemplated that aspects of the present invention may record user consent information implicitly or explicitly. For example, in some aspects, consent may be recorded explicitly in a data consent service to record that customer ID 12345 of organization ID 98765 consented to one or applications IDs and that those secondary applications may retrieve that organization's data through a particular set of APIs. As another example, aspects of the present invention may record a user's consents implicitly by virtue of a secondary application being installed on a platform, on a device, or within a productivity application suite already. If this is the case, aspects of the present invention could enforce that the customer has already seen the consent and record consent without explicitly asking the user to grant permission. Using either an implicit or explicit approach, aspects of the present invention are able to obtain consent for all secondary applications at one time, rather than at many different times or in an unorganized manner.

As mentioned above, the user's consent corresponds to all related secondary applications and primary applications based on relationship information (e.g., permission and registration information) associated with the secondary application selected for deployment. In this manner, a user (e.g., an administrator) may consent to the set of permissions for all related secondary applications to avoid individually granting consent for each secondary application.

At block 316, when a secondary application makes an API call in its corresponding integrated application, aspects of the present invention use integration management portal 110 to determine if consent is recorded at step 318. For example, when a customer uses an add-in application to see sales insights from inside a productivity application, the application-integration component will make API calls to retrieve customer's data from within the productivity application, suite, mobile application, website, or other software. In order to determine if consent is recorded, aspects of the present invention may look up recorded consent in an associated data consent service. Alternatively, aspects of present invention may look at the maximum permissions as recorded in the secondary application's installed manifest.

After consent is determined based on the permissions registered to the corresponding secondary application, at block 320 aspects of the present invention allow the secondary application to make the proper API calls. Any API calls that go beyond the allowed set associated with secondary application are rejected by aspects of the present invention and fail.

Although not shown for clarity, aspects of the present invention contemplate when an ISV publishes an update to one or more secondary applications. In these situations, aspects of the present invention extract the required API access for each secondary application. Aspects of the present invention then compare the set of APIs that were previously consented to by a user with the API access that is part of the newly published update. By comparing the previously consented permissions and API access requirements, aspects of the present invention allow automatic updates to secondary application when the permissions between the two versions remain the same.

Additionally, if an ISV wants to increase trust with a user, aspects of the present invention may receive information from the ISV about their data handling procedures, privacy practices, compliance certifications, and the like so aspects of the present invention may display this information when a user consents to an ISV's secondary applications.

Furthermore, aspects of the present invention allow users to take common actions for consent. For example, aspects of the present invention may allow for only certain individual's data to be accessed by the secondary application or may allow for groups of users to consent at one time. In addition, if a customer decides to revoke secondary applications, aspects of the present invention may remove or disable consent in the associated data consent service or by uninstalling or blocking the installed secondary applications.

FIG. 4 shows a method 400 of managing application integrations, in accordance with aspects of the present invention. Method 400 may be performed in conjunction with a permissions interface, such as the one described with reference to FIG. 7. Method 400 can be used to control the permissions of a single computing device or a group of computing devices. The permissions can be provided and managed by an individual user, by a group administrator, or by some combination of both. Regardless of a person's role or job title, the person giving permissions will be described as a user within the description of FIG. 4. It should be understood that the user could be an administrator and does not need to be using any of the devices or programs managed according to the method 400. An interface used in conjunction with method 400 may require a user password and ID in order to use the interface. In an aspect, only authorized users can give or revoke permission for primary application functions to be accessed by secondary applications. In one aspect, an administrator is able to manage access permissions for multiple primary applications deployed across a group of computing devices.

At step 402, a selection of a secondary application adapted for integration into a group of primary applications is received. In an aspect, a secondary application selection interface is provided. The selection interface can include multiple methods of identifying available secondary applications. In one aspect, a query function is provided that allows the user to search for a secondary application according to a publisher, application title, or other feature of the secondary application. In another aspect, a list of available secondary applications is provided. The list sorted alphabetically, by popularity, by date added, or by some other feature. In one aspect, integrate with a primary application of interest. For example, the secondary application selection interface could show all secondary applications capable of integrating with a particular primary application. In another aspect, a group of related primary applications may be selected to determine secondary applications that can be integrated into the group. For example, a suite of productivity applications could be selected resulting in the display of secondary applications that can be integrated into the productivity applications. For the purpose of step 402, at least one individual secondary application that is adapted for integration into a group of primary applications is selected. It is possible for multiple secondary applications to be selected at the same time in aspects of the technology described herein. The applications can be grouped based on a variety of criteria, such as a common publisher.

At step 404, a permission interface is output for display. The permission interface seeks permission to grant the secondary application access to a plurality of primary-application APIs. The APIs may be shared by a group of primary applications or used by a single primary application. An API is shared by the group of primary applications when two or more applications in the group utilize the same API. It may not be necessary that all applications in the group utilize the API for it to be shared with the group. The permission interface may display a list of all APIs that the secondary application accesses upon integration with the primary application. The list of APIs may be designated by a publisher of the secondary application. In an aspect, the secondary application designates a list of APIs to integrate with as part of the process of registering with a permissions management system. The user interface may generate a list by retrieving the designated list of APIs from the permissions management system.

At step 406, permission information granting the secondary application access to the plurality of APIs is received. The grant of permission may be received by a user interacting with the user interface and giving permission for the secondary application to access the API. The user interface may allow multiple APIs to be selected at the same time. The permissions given may be recorded in a permissions store. The permissions may be accessed later as part of an enforcement process used by the primary application before granting access to an API in response to an API call issued by a secondary application. Once the permissions are received, and integration process may forward. In one aspect, permission to access all APIs designated by a secondary application must be granted before the secondary application can be integrated with the primary application.

At step 408, based on the permission information, the secondary application is integrated into the primary application. As described previously, integration occurs when components of the secondary application are functionally coupled with components of the primary application.

Figure 5:
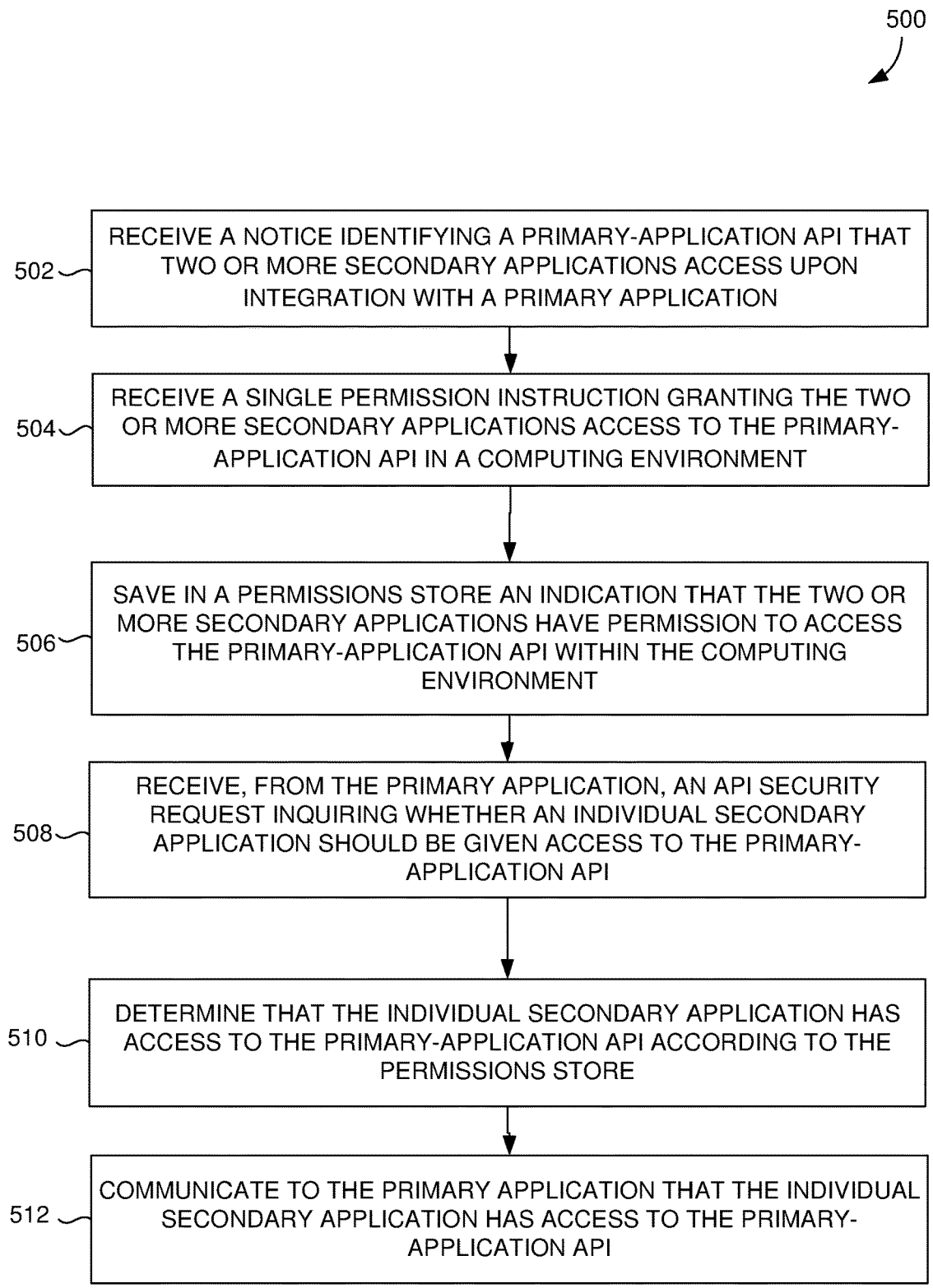
FIG. 5 provides a method of managing application integrations based on permission management operations, in accordance with aspects of the present invention.

Turning now to FIG. 5, a method 500 for managing application integrations is provided, in accordance with aspects of the technology described herein. Method 500 can cover both the collection of API permission information and the use of the permission information to regulate secondary application access to primary-application APIs. Method 500 may be performed by a centralized permissions store and related components, such as those described previously with reference to FIGS. 1, 2, and 3.

At step 502, a notice is received that identifies a primary-application API that two or more secondary applications access upon integration with a primary application. The notice may be received as part of a registration process for the secondary applications. In aspects, the permissions store initially receives information about each secondary application and primary application being managed. This information includes identification information for each application. The information can include an application ID and secret information. The ID and secret information can be used for various purposes, including to validate API calls after the registration process is complete. This information can also include a list of one or more primary applications that an individual secondary application is adapted to integrate with. For each integration between a primary application and a secondary application, a list of APIs the secondary application will access once integrated may be designated by a provider of the secondary application.

At step 504, a single permission instruction is received granting the two or more secondary applications access to the primary-application API in a computing environment. The single permission instruction may be generated by a permissions interface, such as described with reference to FIG. 7. The permissions interface may output a display that combines a permission solicitation for the two or more applications. The permission solicitation may identify the API by name, by function, by a type of data accessed through the API, or through other mechanisms. The single permission instruction covers two or more secondary applications. The secondary applications may be related by a common attribute, such as a common publisher. The single permission instruction reflects that a person in authority over the computing environment being managed has given permission for the two or more secondary applications to access the primary-application API. It should be noted that a revocation instruction can follow the same process. That is, a single instruction can be used to revoke the two or more secondary applications' access to an API.

At step 506, an indication that the two or more secondary applications have permission to access the primary-application API within the computing environment is saved in a permissions store. Storing the indication may involve identifying the two or more secondary applications, identifying the API, and mapping the secondary application identification and API identification to a permissions status, such as granted or not granted.

At step 508, an API security request inquiring whether an individual secondary application should be given access to the primary-application API is received from the primary application. In aspects, primary applications are adapted to clear API calls received from secondary applications with the permissions store before allowing access to the API. Thus, upon receiving an API call from a secondary application the primary application can send a security request that identifies the API, the primary application, and the secondary application to a permissions store. The store then checks its registry to determine whether the secondary application has access to the API according to a grant status. As mentioned, the grant status reflects permissions given previously by a person in authority over the computing system.

At step 510, the individual secondary application is determined to have access to the primary-application API according to the permissions store. The permission store may provide a centralized permission validation for API calls across integrated primary and secondary applications.

At step 512, confirmation that the individual secondary application has access to the primary-application API is communicated to the primary application. Upon receiving the confirmation, the primary application can allow the secondary application to use the primary-application API.

Figure 6:
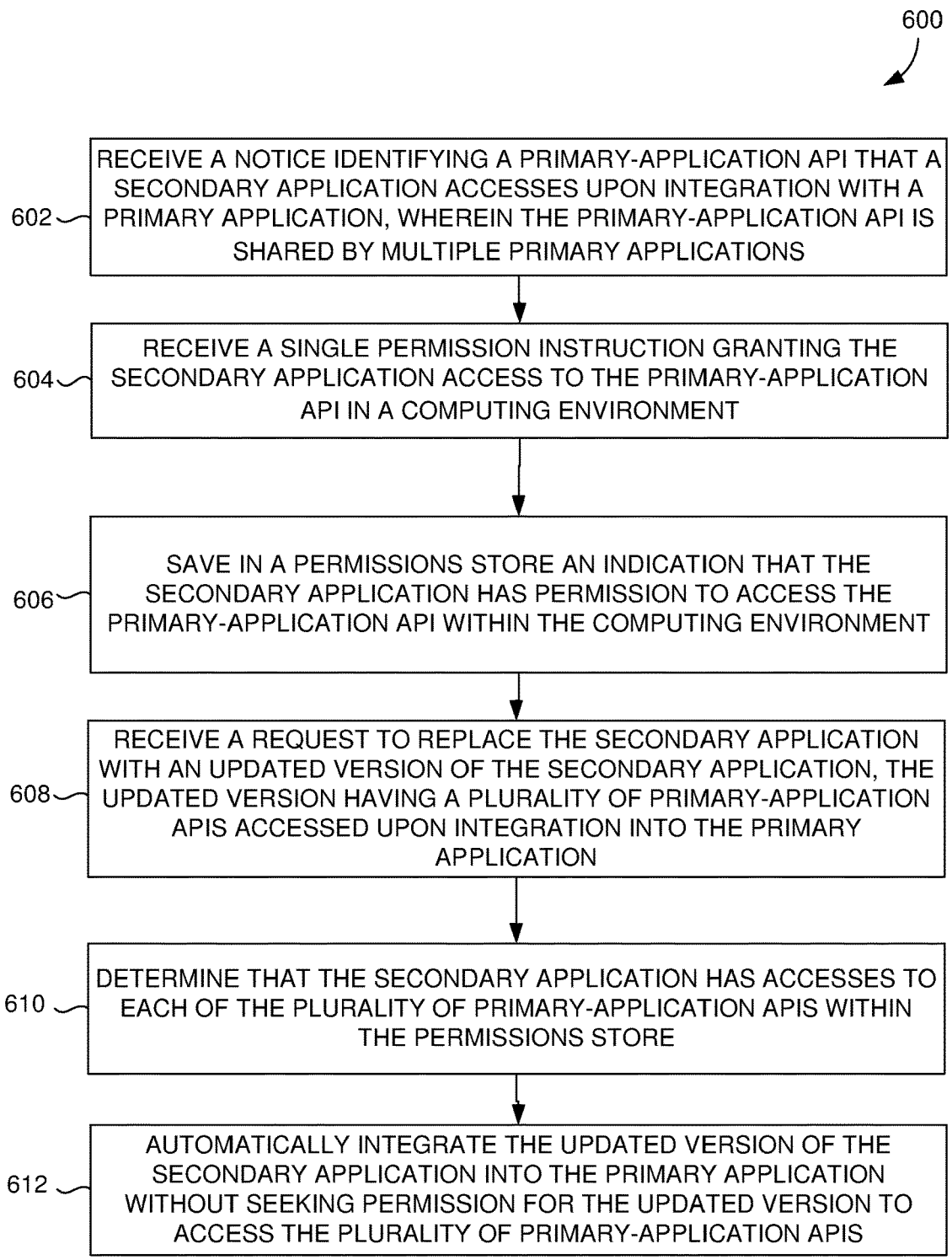
FIG. 6 provides a method of managing application integrations based on permission management operations, in accordance with aspects of the present invention.

Turning now to FIG. 6, a method 600 for managing application integrations is provided, in accordance with aspects of the technology described herein. Method 600 can cover both the collection of API permission information and the use of the permission information to regulate secondary application access to primary-application APIs. Method 600 may be performed by a centralized permissions store and related components, such as those described previously with reference to FIGS. 1, 2, and 3.

At step 602, a notice is received identifying a primary-application API that a secondary application accesses upon integration with a primary application. The primary-application API is shared by multiple primary applications. The notice may be received as part of a registration process for the secondary application. In aspects, the permissions store initially receives information about each secondary application and primary application being managed. This information includes identification information for each application. The information can include an application ID and secret information. The ID and secret information can be used for various purposes, including to validate API calls after the registration process is complete. This information can also include a list of one or more primary applications that an individual secondary application is adapted to integrate with. For each integration between a primary application and a secondary application, a list of APIs the secondary application will access once integrated may be designated by a provider of the secondary application. In this case, two primary applications share the same API.

At step 604, a single permission instruction is received granting the secondary application access to the primary-application API in a computing environment. The single permission instruction may be generated by a permissions interface, such as described with reference to FIG. 7. The permissions interface may output a display that combines a permission solicitation for the two primary applications that share an API. The permission solicitation may identify the API by name, by function, by a type of data accessed through the API, or through other mechanisms. The single permission instruction covers both primary applications. The primary applications may be related by a common attribute, such as a common publisher. The single permission instruction reflects that a person in authority over the computing environment being managed has given permission for the secondary applications to access the primary-application API. It should be noted that a revocation instruction can follow the same process. That is, a single instruction can be used to revoke the secondary application's access to an API.

At step 606, an indication that the secondary application has permission to access the primary-application API within the computing environment is saved in a permissions store. Storing the indication may involve identifying the secondary application, identifying the API, and mapping the secondary application identification and API identification to a permissions status, such as granted or not granted.

At step 608, a request to replace the secondary application with an updated version of the secondary application is received. The updated version has a plurality of primary-application APIs accessed upon integration into the primary application. This list of APIs can be designated by an ISV or other entity associated with the secondary application at the time of registering the updated version with the system. Updated versions may or may not use the same APIs as the earlier version.

At step 610, the secondary application is determined to have access to each of the plurality of primary-application APIs within the permissions store.

At step 612, the updated version of the secondary application is automatically integrated into the primary application without seeking permission for the updated version to access the plurality of primary-application APIs. If the updated version requested access to less APIs than the original secondary application then access to the "extra" APIs could be revoked with the permissions store. The permission store can be updated to replace or add the updated version's information to the store. For example, if the updated version has a different ID or secret from the original version then this new information can be added to the store. If the updated version designates APIs the original version does not have permission to access, then automatic installation is blocked and permission sought for the updated version to access the newly designated APIs that the original version did not have permission to access.

Example User Interface

Figure 7:
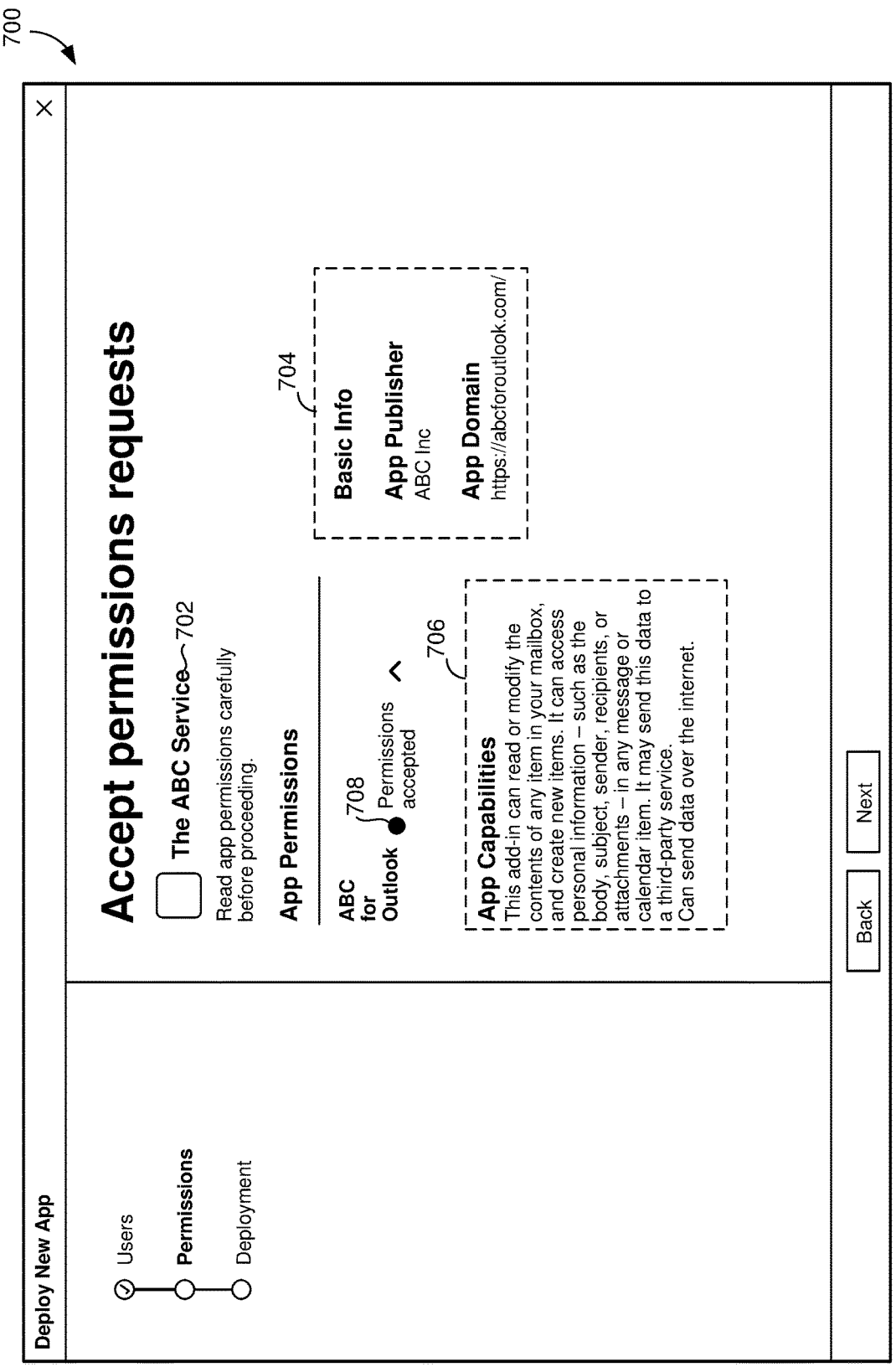
FIG. 7 is an example of a user interface for managing application integrations, in accordance with aspects of the present invention.

FIG. 7 illustrates a user interface suitable for managing application integrations, in accordance with aspects of the present invention. As shown in FIG. 7, a permissions page for deploying a secondary application is shown with details regarding permission and registration information of the secondary application. For example, secondary application 702 may be any secondary application capable of being deployed to multiple users or tenants and capable of running across multiple devices. The registration information of secondary application 702 is displayed in registration information box 704 and may include a plurality of registration information such as, but not limited to, the secondary application's publisher, the secondary application's domain, and an icon for secondary application 702. Registration information box 704 may be useful for a user to determine whether to accept the permissions associated with the secondary application 702.

Additionally, secondary application 702 may have associated permission information detailed in permission information box 706. Permission information box 706 details the capabilities including certain data access requirements required by secondary application 702 in order to be fully deployed and operate using all of its functionality. The permission information box 706 may also include a list of all permission information that the secondary application requires across all primary applications. As one example, secondary application ABC Service may require that it read or modify the contents of any item in any user's mailbox across an entire company and create new items. The permission information listed in permission information box 706 may be accepted by checking accept button 708. By clicking accept button 708, a user agrees to allow all of secondary application's access requests to be accepted and the necessary API calls to be made by secondary application 702. Alternatively, although not shown for clarity, a user may select any number of permissions from permission information box 706 to be deployed. For example, a user may allow secondary application 702 to read or modify the contents of any items in the user's mailbox, but may choose not to allow secondary application 702 to send this data to a third-party service. In this way, a user may selectively choose permissions granted to a secondary application at a granular level and in one location.

Example Distributed Computing Environment

Figure 8:
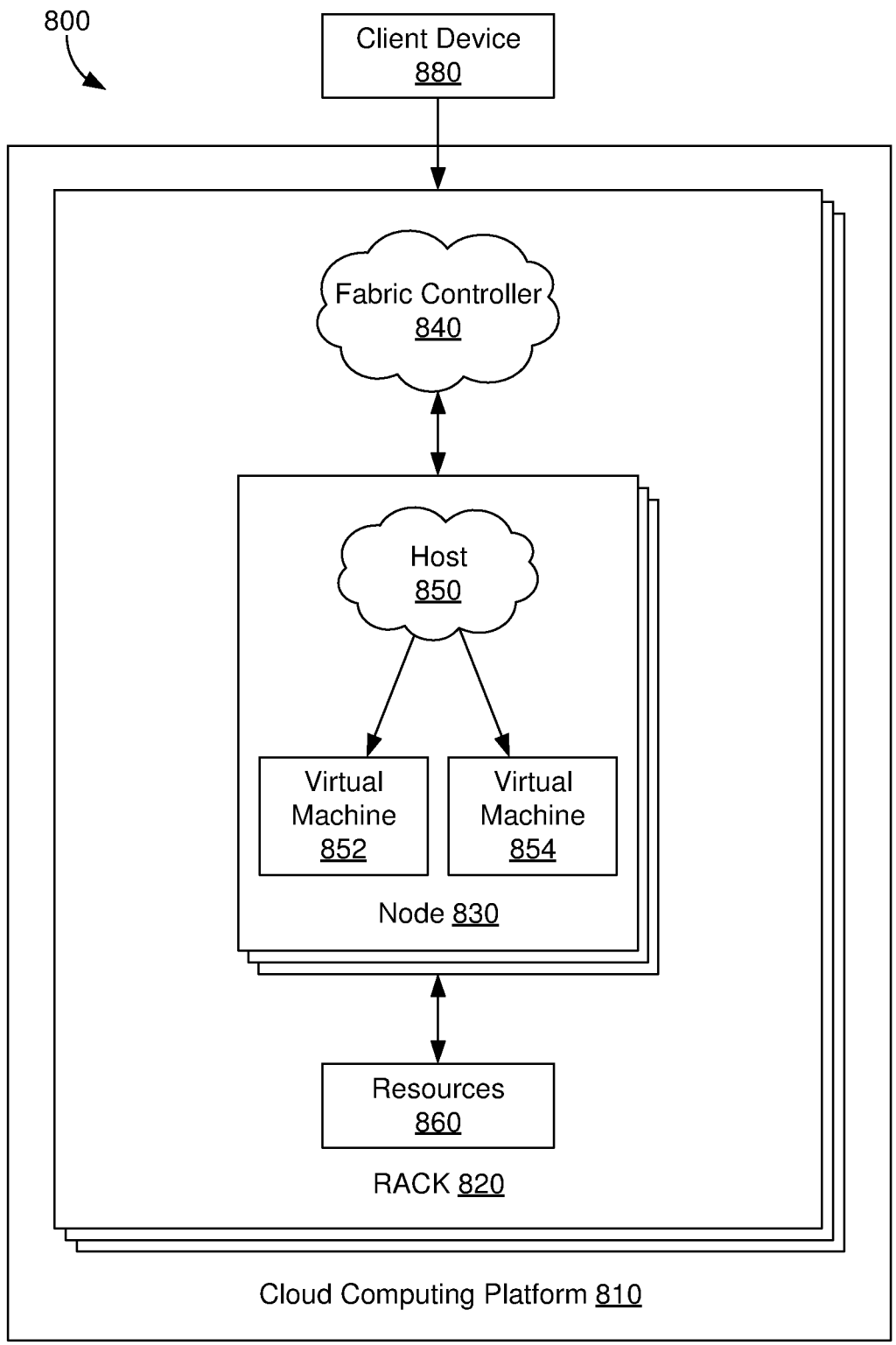
FIG. 8 provides a block diagram of an exemplary distributed computing environment suitable for use in implementing aspects of the technology described herein.

Referring now to FIG. 8, FIG. 8 illustrates an example distributed computing environment 800 in which implementations of the present disclosure may be employed. In particular, FIG. 8 shows a high level architecture of an example cloud computing platform 810 that may host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) may be used in addition to or instead of those shown.

Data centers may support distributed computing environment 800 that includes cloud computing platform 810, rack 820, and node 830 (e.g., computing devices, processing units, or blades) in rack 820. The technical solution environment may be implemented with cloud computing platform 810 that runs cloud services across different data centers and geographic regions. Cloud computing platform 810 may implement fabric controller 840 component for provisioning and managing resource allocation, deployment, upgrade, and management of cloud services. Typically, cloud computing platform 810 acts to store data or run service applications in a distributed manner. Cloud computing infrastructure 810 in a data center may be configured to host and support operation of endpoints of a particular service application. Cloud computing infrastructure 810 may be a public cloud, a private cloud, or a dedicated cloud.

Node 830 may be provisioned with host 850 (e.g., operating system or runtime environment) running a defined software stack on node 830. Node 830 may also be configured to perform specialized functionality (e.g., compute nodes or storage nodes) within cloud computing platform 810. Node 830 is allocated to run one or more portions of a service application of a tenant. A tenant may refer to a customer utilizing resources of cloud computing platform 810. Service application components of cloud computing platform 810 that support a particular tenant may be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines may also concurrently run separate service applications. The virtual machines or physical machines may be configured as individualized computing environments that are supported by resources 860 (e.g., hardware resources and software resources) in cloud computing platform 810. It is contemplated that resources may be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster may be implemented as a node.

Client device 880 may be linked to a service application in cloud computing platform 810. Client device 880 may be any type of computing device, which may correspond to computing device 900 described with reference to FIG. 9, for example, client device 880 may be configured to issue commands to cloud computing platform 810. In aspects, client device 880 may communicate with service applications through a virtual Internet Protocol (IP) and load balancer or other means that direct communication requests to designated endpoints in cloud computing platform 810. The components of cloud computing platform 810 may communicate with each other over a network (not shown), which may include, without limitation, one or more local area networks (LANs) and/or wide area networks (WANs).

Example Operating Environment

Figure 9:
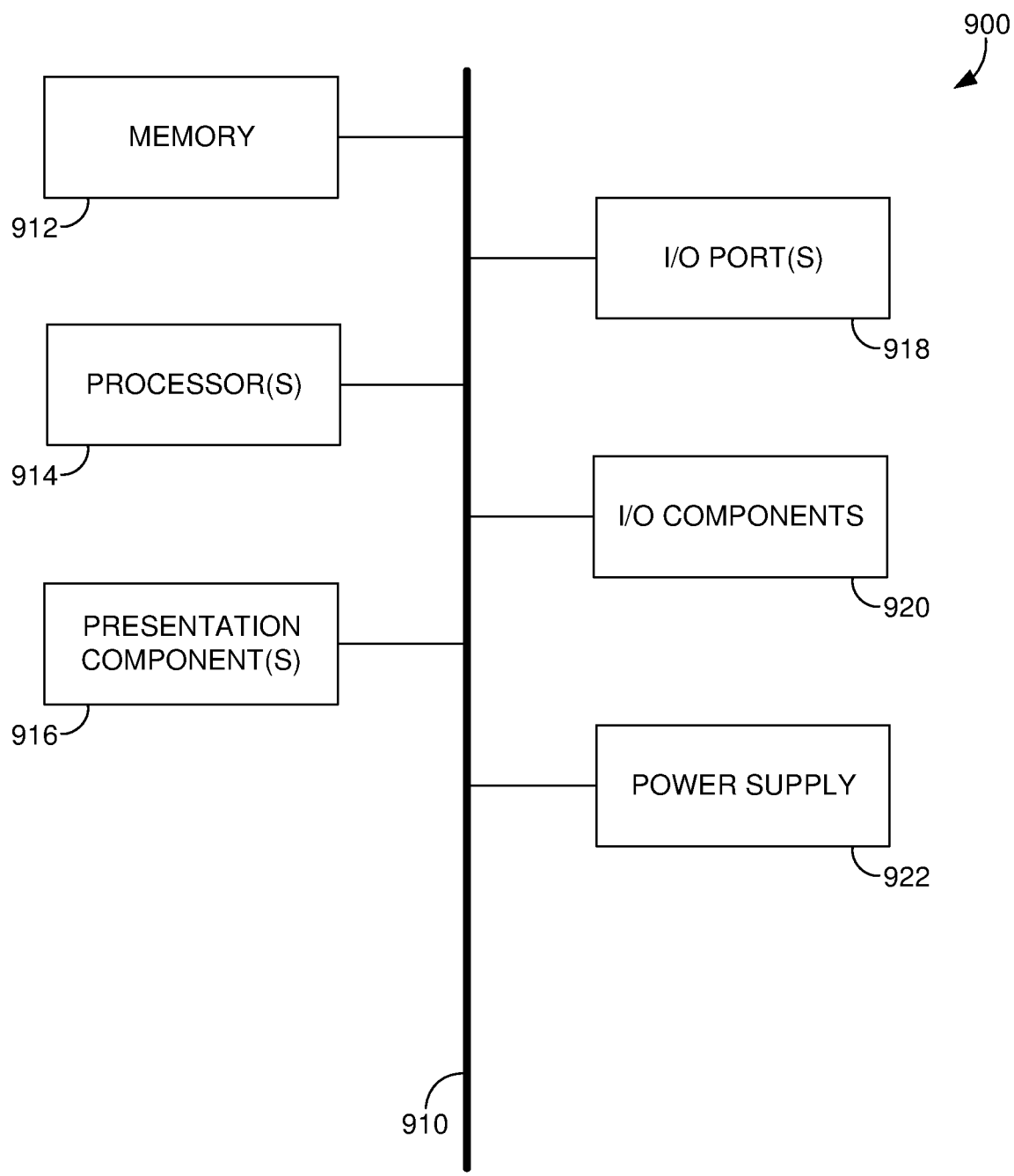
FIG. 9 is a block diagram of an exemplary computing environment suitable for use in implementing aspects of the technology described herein.

Having briefly described an overview of aspects of the present invention, an example operating environment in which aspects of the present invention may be implemented is described below in order to provide a general context for various aspects of the present invention. Referring initially to FIG. 9 in particular, an example operating environment for implementing aspects of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more buses (such as an address bus, data bus, or combination thereof). The various blocks of FIG. 9 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 9 is merely illustrative of an example computing device that may be used in connection with one or more aspects of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media may be any available media that may be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

With reference to the technical solution environment described herein, aspects described herein support the technical solution described herein. The components of the technical solution environment may be integrated components that include a hardware architecture and a software framework that support constraint computing and/or constraint querying functionality within a technical solution system. The hardware architecture refers to physical components and interrelationships thereof, and the software framework refers to software providing functionality that may be implemented with hardware embodied on a device.

The end-to-end software-based system may operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code may provide more complex functionality to higher levels of software. As used herein, computer-executable instructions includes any software, including low level software written in machine code, higher level software such as application software and any combination thereof. In this regard, the system components may manage resources and provide services for system functionality. Any other variations and combinations thereof are contemplated with aspects of the present invention.

By way of example, the technical solution system may include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein may communicate with each other in the technical solution system, as described herein.

Having identified various components utilized herein, it should be understood that any number of components and arrangements may be employed to achieve the desired functionality within the scope of the present disclosure. For example, the components in the aspects depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) may be used in addition to or instead of those shown.

Aspects described in the paragraphs below may be combined with one or more of the specifically described alternatives. In particular, an aspect that is claimed may contain a reference, in the alternative, to more than one other aspect. The aspect that is claimed may specify a further limitation of the subject matter claimed.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, aspects of the present invention are described with reference to a distributed computing environment; however the distributed computing environment depicted herein is merely exemplary. Components may be configured for performing novel aspects of aspects, where the term "configured for" may refer to "programmed to" perform particular tasks or implement particular abstract data types using code. Further, while aspects of the present invention may generally refer to the technical solution environment and the schematics described herein, it is understood that the techniques described may be extended to other implementation contexts.

Aspects of the present invention have been described in relation to particular aspects which are intended in all respects to be illustrative rather than restrictive. Alternative aspects will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for managing application integrations, the method comprising:
   receiving, via a user interface, a notice identifying a primary-application API of a primary application that two or more secondary applications require access to upon integration with the primary application;
   receiving from a user, via the user interface, a single permission instruction granting the two or more secondary applications access to the primary-application API in a computing environment;
   saving in a permissions store an indication that the two or more secondary applications have permission to access the primary-application API within the computing environment;
   receiving, from the primary application, an API security request inquiring whether an individual secondary application has access to the primary-application API;
   determining that the individual secondary application has access to the primary-application API according to the permissions store;
   communicating to the primary application that the individual secondary application has access to the primary-application API; and
   upon receiving an instruction to integrate one of the two or more secondary applications, outputting an explanation that the two or more secondary applications are adapted to be deployed together.

2. The method of claim 1, wherein the two or more secondary applications are not available in a single application store, but are accessed from two different application stores.

3. The method of claim 1, wherein the method further comprises:
   receiving a request to integrate an updated version of a secondary application into the primary application;
   determining that the updated version accesses a new primary-application API that a previous version of the secondary application does not have permission to access;
   automatically seeking permission for the updated version to access the new primary-application API;
   receiving a new permission instruction granting the updated version access to the new primary-application API in the computing environment; and
   saving in the permissions store a new indication that the updated version has permission to access the new primary-application API within the computing environment.

4. The method of claim 1, wherein the single permission instruction grants all secondary applications having an attribute in common access to the primary-application API in the computing environment.

5. The method of claim 4, wherein the attribute in common is an application source.

6. The method of claim 1, wherein the method further comprises:
- receiving a request to integrate an updated version of a secondary application into the primary application;
- determining that the updated version accesses only primary-application APIs that a previous version of the secondary application has permission to access; and
- automatically installing the updated version without seeking access permissions.

7. The method of claim 6, further comprising determining that the updated version does not access a specific primary-application API that a previous version of the secondary application has permission to access; and automatically revoking the updated version's access to the specific primary-application API.

8. A computer-implemented method for managing application integrations, the method comprising:
- receiving, via a user interface, a notice identifying a primary-application API of a primary application that two or more secondary applications require access to upon integration with the primary application;
- receiving from a user, via the user interface, a single permission instruction granting the two or more secondary applications access to the primary-application API in a computing environment;
- saving in a permissions store an indication that the two or more secondary applications have permission to access the primary-application API within the computing environment;
- receiving, from the primary application, an API security request inquiring whether an individual secondary application has access to the primary-application API;
- determining that the individual secondary application has access to the primary-application API according to the permissions store;
- communicating to the primary application that the individual secondary application has access to the primary-application API;
- receiving a request to integrate an updated version of a secondary application into the primary application;
- determining that the updated version accesses a new primary-application API that a previous version of the secondary application does not have permission to access;
- automatically seeking permission for the updated version to access the new primary-application API;
- receiving a new permission instruction granting the updated version access to the new primary-application API in the computing environment; and
- saving in the permissions store a new indication that the updated version has permission to access the new primary-application API within the computing environment.

9. A computer-implemented method for managing application integrations, the method comprising:
- receiving, via a user interface, a notice identifying a primary-application API of a primary application that two or more secondary applications require access to upon integration with the primary application;
- receiving from a user, via the user interface, a single permission instruction granting the two or more secondary applications access to the primary-application API in a computing environment;
- saving in a permissions store an indication that the two or more secondary applications have permission to access the primary-application API within the computing environment;
- receiving, from the primary application, an API security request inquiring whether an individual secondary application has access to the primary-application API;
- determining that the individual secondary application has access to the primary-application API according to the permissions store;
- communicating to the primary application that the individual secondary application has access to the primary-application API;
- receiving a request to integrate an updated version of a secondary application into the primary application;
- determining that the updated version accesses only primary-application APIs that a previous version of the secondary application has permission to access; and
- automatically installing the updated version without seeking access permissions.

* * * * *